(12) United States Patent
Kiriakou

(10) Patent No.: US 7,591,117 B2
(45) Date of Patent: Sep. 22, 2009

(54) WINDOW UNIT

(75) Inventor: Wassilios Kiriakou, Gemmrigheim (DE)

(73) Assignee: Richard Fritz GmbH & Co. KG, Besigheim (DE)

( * ) Notice: Subject to any disclaimer, the term of this patent is extended or adjusted under 35 U.S.C. 154(b) by 0 days.

(21) Appl. No.: 11/330,390

(22) Filed: Jan. 12, 2006

(65) Prior Publication Data

US 2006/0168903 A1 Aug. 3, 2006

Related U.S. Application Data

(63) Continuation of application No. 09/529,674, filed as application No. PCT/EP99/06051 on Aug. 18, 1999, now abandoned.

(30) Foreign Application Priority Data

Aug. 18, 1998 (DE) ................. 198 37 308

(51) Int. Cl.
*E04C 2/20* (2006.01)

(52) U.S. Cl. ............ 52/716.5; 52/214; 52/716.7; 52/716.8; 52/204.53; 296/146.15; 296/93

(58) Field of Classification Search ........... 296/93, 296/201, 146.15
See application file for complete search history.

(56) References Cited

U.S. PATENT DOCUMENTS

| | | | |
|---|---|---|---|
| 1,458,396 A | | 6/1923 | Currier |
| 2,175,909 A | | 10/1939 | Nelson |
| 2,497,957 A | * | 2/1950 | Pelley .................. 52/775 |
| 3,155,204 A | * | 11/1964 | Leslie et al. .......... 52/208 |
| 3,416,833 A | * | 12/1968 | Griffin ................. 296/93 |
| 3,714,751 A | | 2/1973 | Lackey |
| 3,846,948 A | | 11/1974 | Dallen |
| 4,165,119 A | | 8/1979 | Hedeen et al. |
| 4,358,917 A | | 11/1982 | Oda et al. |
| 4,412,406 A | | 11/1983 | Sengoku |
| 4,571,278 A | | 2/1986 | Kunert |
| 4,621,469 A | | 11/1986 | Krueschwitz |
| 4,648,222 A | * | 3/1987 | Miyata et al. ......... 52/208 |
| 4,668,556 A | | 5/1987 | Hermann et al. |
| 4,892,351 A | | 1/1990 | Ono et al. |
| 4,950,019 A | * | 8/1990 | Gross ................... 296/93 |
| 4,968,543 A | * | 11/1990 | Fujioka et al. ........ 428/31 |
| 5,001,876 A | * | 3/1991 | Harper et al. ........ 52/208 |

(Continued)

FOREIGN PATENT DOCUMENTS

DE 41 41 813 A1 9/1983

(Continued)

*Primary Examiner*—Phi D. A
(74) *Attorney, Agent, or Firm*—Foley & Lardner LLP

(57) ABSTRACT

The invention relates to a window unit (10) comprising a window pane (11) and a frame (12). The frame (12) consists of two parts, a basic frame (15) and an additional frame (16). The basic frame (15) has a bearing surface (17) which contacts the window pane (11) to which the frame is permanently fixed by means of an adhesive layer (19) deposited on the bearing surface. The basic frame (15) further comprises a connecting surface (21) for the additional frame (16). Said additional frame (16) in turn also has a connecting surface (21) of the basic frame (15). The two frame parts (15; 16) are removably or permanently joined together via their connecting surfaces (21; 26).

21 Claims, 2 Drawing Sheets

U.S. PATENT DOCUMENTS

| | | | |
|---|---|---|---|
| 5,009,462 A | | 4/1991 | Katcherian |
| 5,069,012 A | * | 12/1991 | Riederer .................... 52/208 |
| 5,078,444 A | * | 1/1992 | Shirahata et al. ............ 296/93 |
| 5,114,206 A | * | 5/1992 | Yada ......................... 296/201 |
| 5,170,587 A | * | 12/1992 | Nakatani et al. ............ 49/490.1 |
| 5,228,738 A | * | 7/1993 | Kato .......................... 296/93 |
| 5,396,746 A | * | 3/1995 | Whitmer ..................... 52/208 |
| 5,524,955 A | | 6/1996 | Brocke et al. |
| 5,603,546 A | * | 2/1997 | Desir, Sr. .................... 296/93 |
| 5,669,657 A | | 9/1997 | Miyazawa |
| 5,758,459 A | | 6/1998 | Koike et al. |
| 5,768,837 A | | 6/1998 | Sjoeholm |
| 5,833,297 A | * | 11/1998 | Yada et al. .................. 296/93 |
| 5,935,356 A | * | 8/1999 | Soldner ....................... 156/71 |
| 5,950,398 A | | 9/1999 | Hubbard |
| 6,012,257 A | | 1/2000 | Caplette |
| 6,101,783 A | | 8/2000 | Howes |
| 6,105,333 A | | 8/2000 | Meesemaecker et al. |
| 6,287,402 B2 | | 9/2001 | Soldner |
| 6,347,491 B1 | * | 2/2002 | Legrand .................. 52/204.62 |

FOREIGN PATENT DOCUMENTS

| | | |
|---|---|---|
| DE | 33 33 672 A1 | 4/1985 |
| DE | 195 04 828 A1 | 8/1996 |
| EP | 0 128 837 A1 | 12/1984 |
| EP | 0 249 560 A1 | 12/1987 |
| FR | 2 757 805 A1 | 7/1998 |
| WO | WO 95/21749 A1 | 8/1995 |

* cited by examiner

WINDOW UNIT

The present application is a continuation of U.S. application Ser. No. 09/529,674 filed Jun. 19, 2000, the entire contents of which are incorporated herein by reference.

BACKGROUND OF THE INVENTION

DE 195 04 828.8 A1 discloses a window unit in which a secondary frame part is integrally formed on the glass window and is subsequently combined with a primary frame part, which has been produced separately. The disadvantage with this window unit is that the secondary frame part is integrally formed on the window in a rigid injection mold. This means that it is not possible for the frame to be adjusted to the glass windows. There may be deviations of up to 3 mm.

SUMMARY OF THE INVENTION

The object of the invention is to provide a window unit whose frame can be easily adjusted to the dimensions of the glass window.

Since the frame is of two-part design and is made up of a basic frame and of an additional frame, which are each produced individually as separate moldings, both the basic frame and the additional frame may be produced from a material whose properties are geared precisely to the requirements of the relevant frame part. Since the basic frame has an abutment surface by means of which it is positioned at least against one side of the window and can be permanently connected thereto, it is possible for at least the basic frame to be aligned with the border of the window or with an equidistant line. Since both frame parts each have a connection surface, said connection surfaces being coordinated with one another, the additional frame may be connected in a releasable or non-releasable manner to the basic frame, in which case it is then likewise aligned with the border of the glass window or with an equidistant line.

A configuration according to subsequently disclosed structures achieves particularly favorable properties for the basic frame and the additional frame, respectively.

A configuration according to subsequently disclosed structures allows the additional frame to be configured as a decorative trim.

In a configuration according to subsequently disclosed embodiments, it is possible for the additional frame to be aligned in a different position relative to the basic frame as far as the distance from the window is concerned.

By virtue of a configuration according to subsequently disclosed structural arrangements, the additional frame is permanently and captively connected to the basic frame. By virtue of a configuration according to subsequently disclosed arrangements, the additional frame is connected in a releasable manner to the basic frame, with the result that, if required, it may be exchanged for an additional frame of the same profile but made of a different plastic. However, it may just as well be exchanged for an additional frame of a different profile.

BRIEF DESCRIPTION OF THE DRAWINGS

The invention is explained in more detail hereinbelow with reference to two exemplary embodiments illustrated in the drawings, in which.

DETAILED DESCRIPTION OF THE PREFERRED EMBODIMENTS

Figure 1:
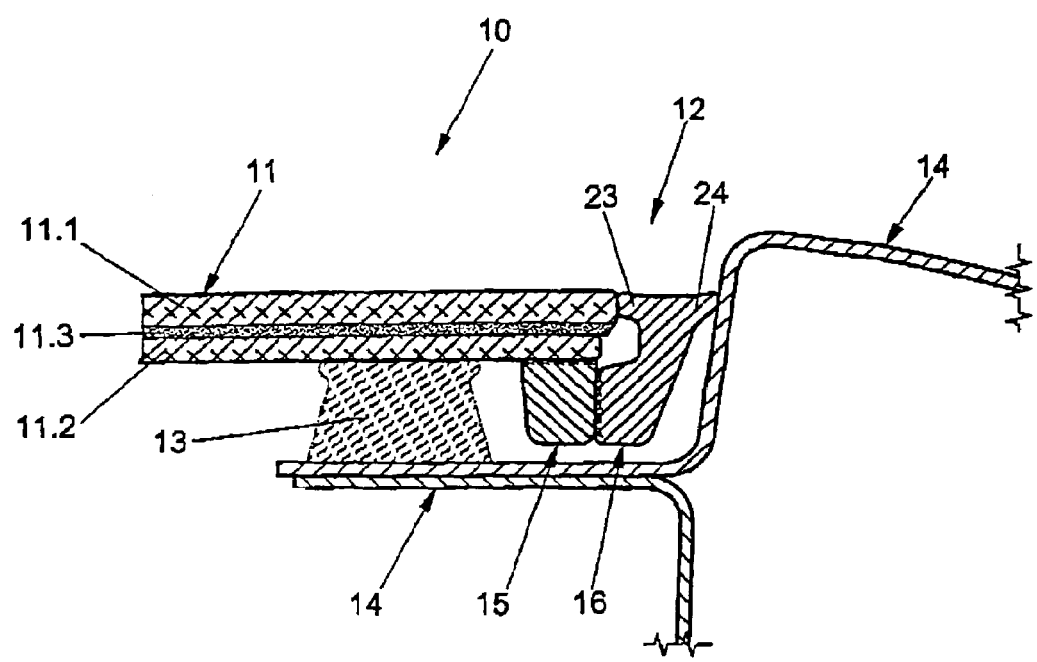
FIG. 1 shows a cross section, illustrated in detail form, of a window unit comprising window and two-part frame, together with a vehicle-body part.

The window unit 10 which can be seen from FIG. 1 has a window 11 and a frame 12.

The window 11 is designed as a laminated-glass window which is made up of an outer window part 11.1 and of an inner window part 11.2, these being permanently connected to one another by means of an intermediate layer 11.3. The frame 12 is connected to the window 11 along the border region of the latter. The window unit 10 is connected to a vehicle-body part 14 by means of a bead of adhesive 13.

Figure 2:
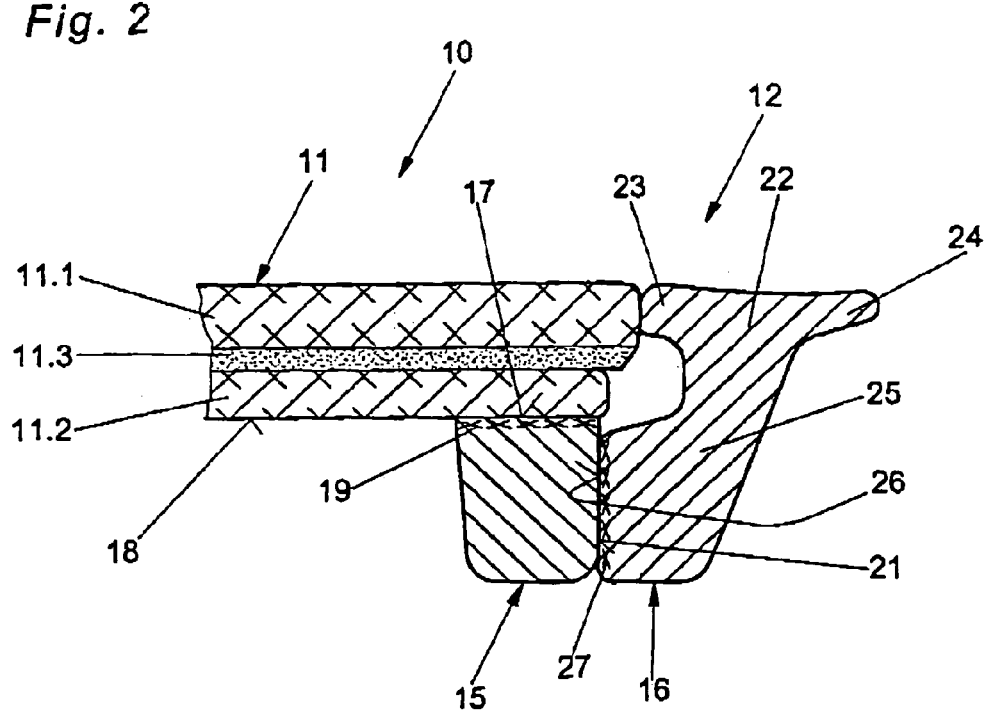
FIG. 2 shows a cross section, illustrated in detail form, of a first embodiment of the two-part frame.

In that exemplary embodiment of the window unit 10 which can be seen from FIG. 2, the frame 11 is of two-part design and is made up of a basic frame 15 and of an additional frame 16.

On its side which is directed toward the window 11, the basic frame 15 has an abutment surface 17 by means of which it butts against the inside 18 of the window 11, in the border region thereof, and is permanently connected to said window by means of an application of adhesive 19. On its outside, which is located on the right in FIG. 2, the basic frame 15 has a connection surface 21. This serves for connection to the additional frame 16. The connection surface 21 is aligned at least more or less normal to the surface of the window 11.

The additional frame 16 forms a transition from the window 11 to the vehicle-body part 14 (FIG. 1). It thus has a profile section 22 with two abutment lips 23 and 24. The abutment lip 23 butts against the peripheral surface of the window 11. The abutment lip 24 butts against an opposite surface section of the vehicle-body part 14 (FIG. 1). The profile section 22 is configured such that, with the window unit 10 in the installed position, the two abutment lips butt against the respectively adjacent part with a certain amount of prestressing. If the window 11 is designed as a laminated-glass window, as is illustrated in FIG. 2, it is expedient for the abutment lip 23 to butt against the outer window part 11.1 of the laminated-glass window.

In the case of the additional frame 16, the profile section 22 is adjoined by a second profile section 25, which extends at least more or less as far as the plane of the underside of the basic frame 15. On the side which is directed toward the basic frame 15, said profile section 25 has a connection surface 26 which is coordinated with the connection surface 21 of the basic frame 15.

The basic frame 15 is arranged on the window 11 such that its connection surface 21 is at least more or less flush with the border of the window 11, in particular with the border of the outer window part 11.1. Depending on the given features of the window 11 and/or of the vehicle-body part 14, it may also be expedient, however, for the basic frame to be aligned with an equidistant line in relation to the border of the window 11.

The additional frame 16 is permanently connected to the basic frame 15 by means of an application of adhesive 27, which has been provided either on the connection surface 21 or on the connection surface 26 or else on both connection surfaces. The additional frame 16 is arranged on the basic frame 15 such that its abutment lip 23 is located at least more or less level with the border of the outer window part 11.1. In this way, it is easily possible to compensate, on the one hand, for window-size tolerances and, on the other hand, for tolerances relating to the course taken by the border of the window.

However, it is also possible for the additional frame 16 to be aligned relative to the basic frame 15 on the basis of other aspects.

Figure 3:
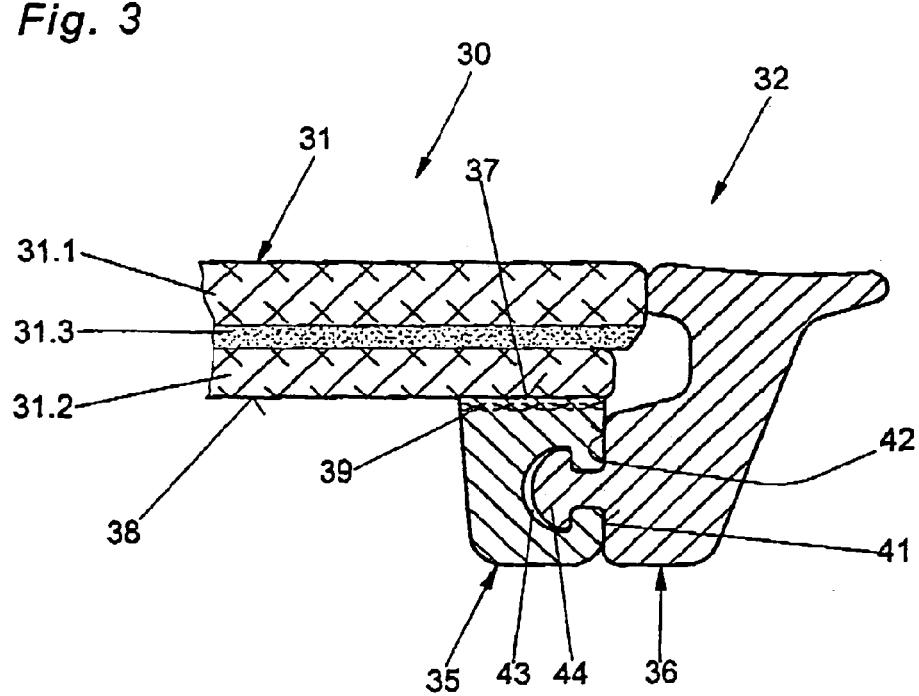
FIG. 3 shows a cross section, illustrated in detail form, of a second embodiment of the two-part frame.

The window unit 30, which can be seen from FIG. 3, has the window 31 and the frame 32. The window 31 is, once again, designed as a laminated-glass window, which has the outer window part 31.1 and the inner window part 31.2 which are permanently connected to one another by means of the intermediate layer 31.3. The frame 32, once again, is of two-part design and is made up of the basic frame 35 and the additional frame 36. The basic frame 35 has the abutment surface 37 which is directed toward the window 31 and is permanently connected to the underside 38 of the window 31 by means of the application of adhesive 39. On the side which is directed toward the additional frame 36, the basic frame 35 has the at least more or less planar connection surface 41. The connection surface 42 of the additional frame 36 butts against said connection surface 41. Provided for the purpose of connecting the two frame parts 35 and 36 are connecting elements which are formed by coordinated profile sections, on the one hand, of the basic frame 35 and, on the other hand, of the additional frame 36.

On the basic frame 35, this profile section is formed by a recess 43 which has a mushroom-shaped outline and is open in the direction of the additional frame 36. On the additional frame 36, the corresponding profile section is formed by a protrusion 44 which likewise has a mushroom-shaped outline, which is coordinated with the outline of the recess 43. The profile sections 43 and 44 are provided at least in certain regions along the longitudinal extent of the frame parts 35 and 36. They generally extend over the entire length of the periphery of the frame parts.

The basic frame 35 is arranged on the window 31 such that its connection surface 41 is flush with the border of the window 31, in particular with the border of the outer window part 31.1. On account of the interengagement of the profile sections 43 and 44, the additional frame 36 is fixed in its position relative to the basic frame 35 and the window 11. However, if required, the additional frame 36 may be exchanged, e.g. for a frame part of a different material or else for a frame part of a different profile, in particular of different dimensions coordinated with differing dimensions of the window 11 and/or of the vehicle-body part 14.

What is claimed is:

1. Window unit adapted to be inserted into and held in a metallic vehicle body window frame, comprising:
    a window pane having an inboard surface, an outboard surface and a peripheral edge surface; and
    a frame, the frame being made up of a basic frame and an additional frame,
    wherein the basic frame (a) comprises a separate molding that is pre-formed to have a first molded profile from an elastic material, (b) has an abutment surface which abuts against the inboard surface of the window pane and via which the basic frame is permanently connected to the window pane by an adhesive interposed between the basic frame and the window pane, and (c) has a connection surface facing in the direction of the peripheral edge of the window pane for connection to the additional frame, and
    wherein the additional frame comprises a separate molding that is pre-formed to have a second molded profile that includes a connection surface which faces and is coordinated with the connection surface of the basic frame and which is selectively connected to the connection surface of the basic frame at a relative juxtaposition with respect to the basic frame such that a portion of said second profile terminates in contact with the peripheral edge surface of the window pane.

2. A window unit according to claim 1, wherein the basic frame comprises a synthetic resin material.

3. A window unit according to claim 1, wherein the additional frame comprises an elastomer.

4. A window unit according to claim 1, wherein the additional frame is produced from a metal/plastic combination.

5. A window unit according to claim 1, wherein the connection surface of the basic frame and the connection surface of the additional frame are essentially normal to the inboard surface of the window pane.

6. A window unit according to claim 1, wherein the basic frame and the additional frame are non-releasably connected to one another.

7. A window unit according to claim 1, further comprising:
    mating connecting elements formed integrally in the connection surface of the basic frame and the connection surface of the additional frame, the connecting elements comprising profile sections by means of which the two frame parts are connected to one another.

8. A window unit according to claim 1,
    wherein the basic frame is bonded to the inboard surface in a selected predetermined spatial relationship with the window pane, which compensates for dimensional variation in the window pane, and
    wherein the second profile of the additional frame has an inboard abutment lip and an outboard abutment lip, wherein the inboard abutment lip forms said portion of said second profile that terminates in contact with the peripheral edge surface of the window pane, whereby said inboard abutment lip abuts the peripheral edge surface of the window pane, and the outboard abutment lip is shaped and sized so that the outboard abutment lip will abut with the metallic vehicle window frame in a final installed condition of the window unit.

9. A window unit according to claim 8, wherein the basic frame is arranged essentially flush with the edge surface of the window pane, and wherein the connection surface of the additional frame is positioned and bonded to the connection surface of the basic frame so that the inboard abutment lip engages the edge surface of the window so as to be essentially flush with the outboard surface of the window pane.

10. A window unit according to claim 9, wherein the selective connection of the basic frame and the additional frame is selected to negate variations in dimensions in at least one of the window pane and the metallic vehicle window frame and to provide engagement between the inboard abutment lip and the edge surface of the window pane and between the outboard abutment lip and the metallic vehicle body window frame in a final installed condition of the window unit.

11. A window unit according to claim 1, wherein the basic frame has a length in the direction extending away from the inboard surface of the window pane such that the basic frame forms a gap, in a final installed position, between its distal end and the metallic vehicle body window frame into which the window unit is installed.

12. A window unit according to claim 2, wherein the synthetic resin material comprises PVC.

13. A window unit according to claim 1, wherein the second profile of the additional frame does not contact the window pane other than at said peripheral edge surface.

14. A window unit according to claim 1, wherein the additional frame and the basic frame are made from a non-adhesive material.

15. A window unit according to claim 1, wherein the basic frame and the additional frame are made from different materials having different properties.

16. A window unit according to claim 6, wherein the basic frame and the additional frame are non-releasably connected to one another by adhesive which is provided on at least one of the basic frame and the additional frame and is interposed between the respective connection surfaces of the basic frame and the additional frame.

17. A window unit according to claim 1, wherein the basic frame and the additional frame are releasably connected to one another.

18. A vehicle body assembly, comprising: a window unit that is inserted into and held in a metallic vehicle body window frame, wherein the window unit comprises
   a window pane having an inboard surface, an outboard surface and a peripheral edge surface; and
   a frame, the frame being made up of a basic frame and an additional frame,
   wherein the basic frame (a) comprises a separate molding that is pre-formed to have a first molded profile from an elastic material, (b) has an abutment surface which abuts against the inboard surface of the window pane and via which the basic frame is permanently connected to the window pane by an adhesive interposed between the basic frame and the window pane, and (c) has a connection surface facing in the direction of the peripheral edge of the window pane for connection to the additional frame, and
   wherein the additional frame comprises a separate molding that is pre-formed to have a second molded profile that includes a connection surface which faces and is coordinated with the connection surface of the basic frame and which is selectively connected to the connection surface of the basic frame at a relative juxtaposition with respect to the basic frame such that a portion of said second profile terminates in contact with the peripheral edge surface of the window pane.

19. A vehicle body assembly as defined by claim 18, wherein the basic frame is bonded to the inboard surface in a selected predetermined spatial relationship with the window pane, which compensates for dimensional variation in the window pane, and
   wherein the second profile of the additional frame has an inboard abutment lip and an outboard abutment lip, wherein the inboard abutment lip forms said portion of said second profile that terminates in contact with the peripheral edge surface of the window pane, whereby said inboard abutment lip abuts the peripheral edge surface of the window pane, and the outboard abutment lip is shaped and sized so that the outboard abutment lip abuts with the metallic vehicle window frame.

20. A vehicle body assembly as defined by claim 18, further comprising a bead of adhesive, located radially inwardly of said basic frame, that adhesively bonds the window pane to the metallic vehicle window frame.

21. A method for producing a vehicle body assembly comprising a window unit that is inserted into and held in a metallic vehicle body window frame, wherein the window unit comprises: a window pane having an inboard surface, an outboard surface and a peripheral edge surface; and a frame, the frame being made up of a basic frame and an additional frame, wherein the basic frame (a) comprises a separate molding that is pre-formed to have a first molded profile from an elastic material, (b) has an abutment surface which abuts against the inboard surface of the window pane and via which the basic frame is permanently connected to the window pane by an adhesive interposed between the basic frame and the window pane, and (c) has a connection surface facing in the direction of the peripheral edge of the window pane for connection to the additional frame. and wherein the additional frame comprises a separate molding that is pre-formed to have a second molded profile that includes a connection surface which faces and is coordinated with the connection surface of the basic frame and which is selectively connected to the connection surface of the basic frame at a relative juxtaposition with respect to the basic frame such that a portion of said second profile terminates in contact with the peripheral edge surface of the window pane, comprising:
   adhesively bonding the basic frame to the inboard surface of the window pane;
   selectively juxtapositioning the additional frame with respect to the basic frame such that a portion of said second profile terminates in contact with the peripheral edge surface of the window pane; and
   connecting the connection surface of the basic frame to the connection surface of the additional frame in the selected relative juxtaposition.

* * * * *